United States Patent [19]
Bradley

[11] 3,931,774
[45] Jan. 13, 1976

[54] SEEDLING PLANTER APPARATUS

[75] Inventor: Edmund G. Bradley, Gormley, Canada

[73] Assignee: Her Majesty the Queen in right of Ontario, as represented by the Minister of Natural Resources, Toronto, Canada

[22] Filed: June 21, 1974

[21] Appl. No.: 481,668

[52] U.S. Cl.......................................... 111/3; 172/5
[51] Int. Cl.². ........................................ A01C 11/00
[58] Field of Search ................ 111/2, 3; 172/4, 5, 3, 172/233, 234, 235; 171/8

[56] References Cited
UNITED STATES PATENTS

| 534,426 | 2/1895 | Cooper | 172/4 |
|---|---|---|---|
| 1,044,304 | 11/1912 | Urdahl | 111/3 |
| 2,695,577 | 11/1954 | Webster | 111/3 X |
| 2,853,962 | 9/1958 | Cease et al. | 111/3 X |
| 3,097,616 | 7/1963 | Arnold | 111/3 |

Primary Examiner—Stephen C. Pellegrino
Attorney, Agent, or Firm—Sim & McBurney

[57] ABSTRACT

This invention provides a planting apparatus which includes a mobile frame mounted on wheels or the like and adapted to be towed over the ground. An arm is swingably mounted to the frame and extends rearwardly from the mounting location. The arm carries a dibble on its moveable end, which is adapted to cut into the ground during forward travel of the mobile frame. A planter is carried by the arm rearwardly of the dibble and is adapted to support a seedling for planting in the cut made by the dibble. Means is provided to dislodge the seedling from the planter into the cut. Detection means is provided for detecting when the dibble has cut to a predetermined depth into the ground, and for activating the dislodging means whenever that depth is reached. The arm is swung regularly toward and away from the ground, such that the dislodging means fails to operate if the dibble achieves less than the pre-determined depth due to an obstacle. Thus seedlings are planted only where no obstacles are located.

10 Claims, 7 Drawing Figures

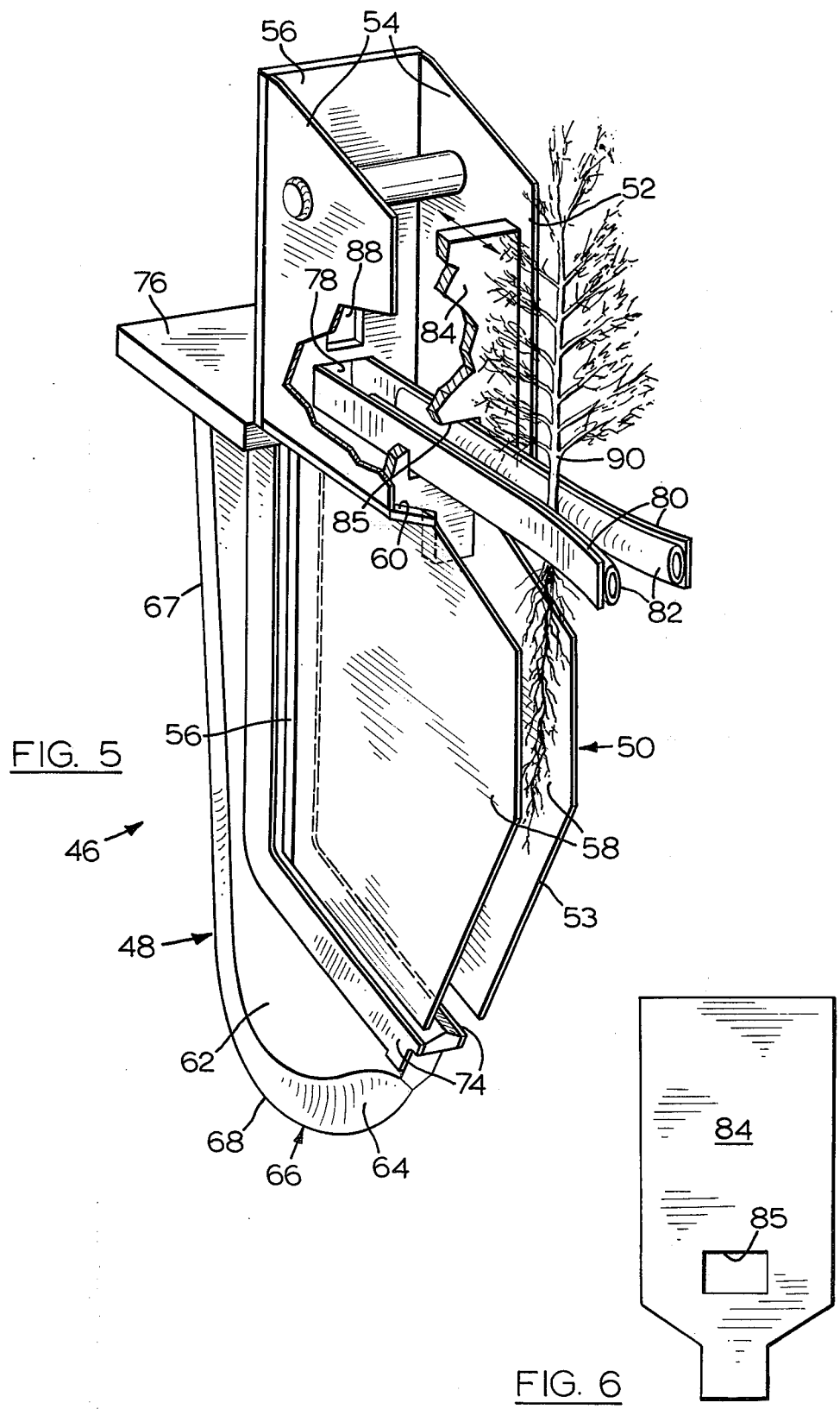

SEEDLING PLANTER APPARATUS

This invention relates to apparatus for the selective planting of small trees, known as seedlings, in any kind of terrain, and particularly in non-uniform terrain such as that in which boulders and rocks occur at or just under the surface.

In reforestation and similar projects it is desirable to utilize a mobile planting unit which may be trailed behind a tractor or other towing vehicle, and which may be operated by one man. Conventional seedling planting machines usually include a coulter (a plowing disc adapted to cut an initial slice into the ground), and a planting shoe closely following the coulter, the planting shoe having a leading knife edge and a bifurcated following portion which defines a slot immediately following the cutting edge, into which slot the operator can drop a seedling. The planting shoe spreads the earth that has already been sliced by the coulter to a sufficient degree to permit the roots of the seedling to be received into the ground. Positioned immediately behind the planting shoe in the direction of travel, the machine includes some sort of tamping means to pack the earth in around the seedling, and one common tamping means includes two tamping wheels, one on either side of the furrow in which the seedlings are planted.

In the conventional planting machine as described above, it is usually the weight of the entire planting portion of the apparatus which bears downwardly on the coulter and the planting shoe to keep them cutting into the earth. If the coulter hits a rock or other buried hard item, it often causes the entire planting machine to rise up into the air, and can often become damaged itself in the process. This results in a very rough ride for the operator on any terrain where buried obstacles such as rocks and boulders are present.

In addition to the foregoing disadvantage, the conventional planting machine also generally lacks any provision for automatically dispensing seedlings at regulated intervals into the furrow. If such a provision were made, it would relieve the operator of this task.

In view of the foregoing, it is among the objects of this invention to provide a planting apparatus capable of detecting the presence of an obstacle on or below the surface of the ground in a line along which seedlings are being planted.

A further object of this invention is to provide a planting apparatus capable of regularly dispensing seedlings into an intermittent cut slit, and further capable of arresting the dispensing and cutting steps whenever an obstacle on or below the surface is detected.

A further object of this invention is to provide a planting apparatus which gives an easy ride to the operator on difficult terrain.

It is yet a further object of this invention to provide a planting apparatus in which both the pressure of the packing means and the pressures of both furrow-cutting and seedling-dispensing means are adjustable.

Accordingly, this invention provides a planting apparatus, comprising a mobile frame adapted to travel forwardly over the ground, an arm swingably mounted to the frame and extending generally rearwardly from the mounting location, dibble means carried by the arm remote from said mounting location and adapted to cut into the ground when the arm swings toward the ground during forward travel of the frame, planter means carried by the arm rearwardly of said dibble means and adapted to support a seedling for planting in the cut made by said dibble means, dislodging means adapted selectively to dislodge a seedling from said planter means into said cut, detection means for detecting when the dibble means has cut to a pre-determine depth into the ground and for activating said dislodging means whenever such pre-determined depth is reached, and means for regularly swinging the arm toward and away from the ground, whereby said dislodging means fails to operate if the dibble means fails to achieve said pre-determined depth due to an obstacle.

One embodiment of this invention is shown on the accompanying drawings, in which like numerals denote like parts throughout the several views, and in which:

FIG. 5 is a partly broken-away perspective view of the digger and planter portion of this invention;

FIG. 6 is an elevational view of one component of the mechanism shown in FIG. 5.

Figure 1:
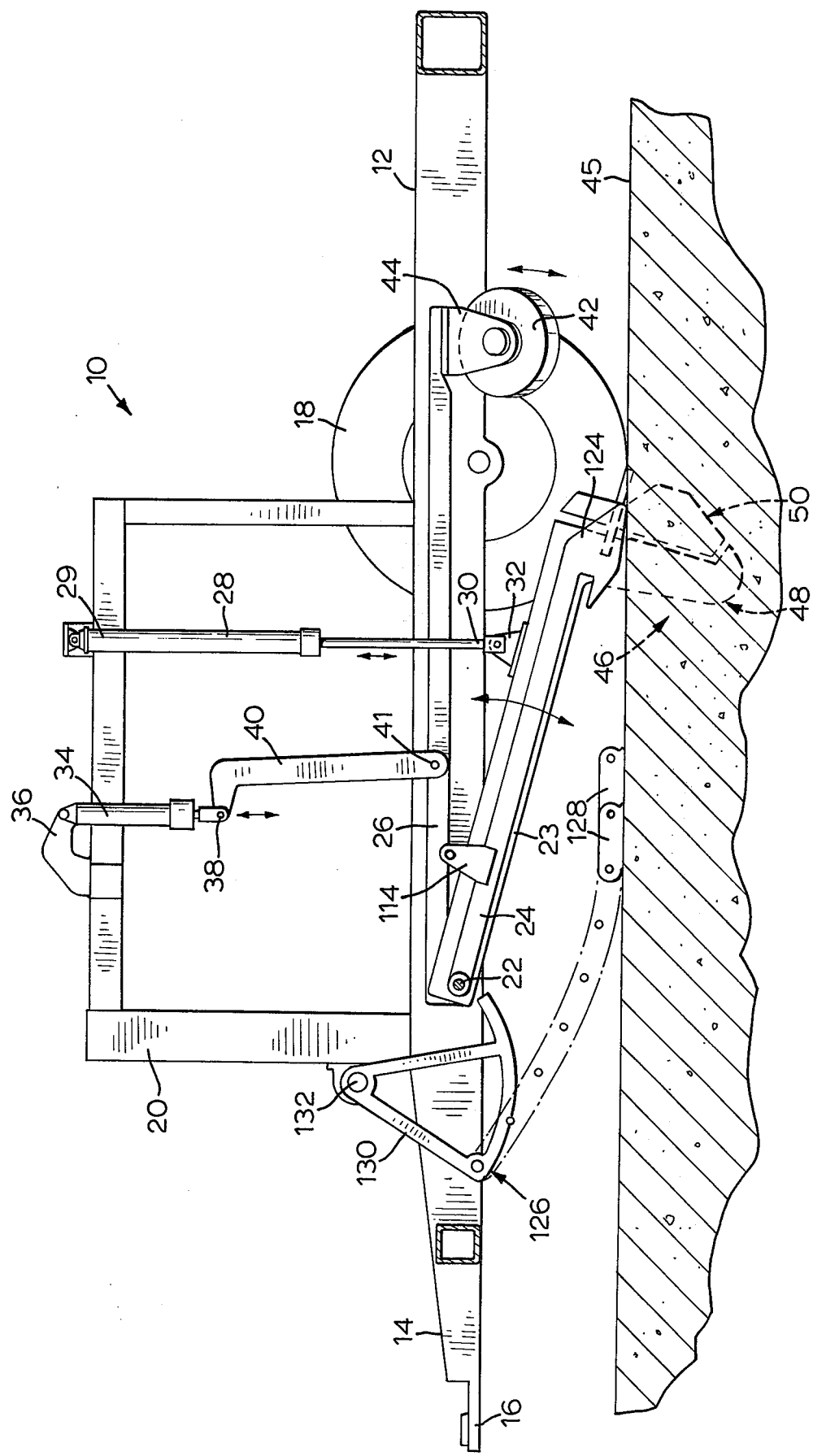
FIG. 1 is a simplified elevational view of the essential components of the planting apparatus of this invention.

Attention is first directed to FIG. 1, in which an apparatus shown generally at 10 is seen to include a horizontal frame 12 having a forward end 14 supporting a towing tongue 16. The frame 12 rides on two large air-filled wheels of which one is seen at 18.

A superstructure 20 is provided, to serve a purpose later to be explained.

The view of FIG. 1 is somewhat schematic, in that it is intended to illustrate the essential components of the apparatus without the unnecessary complication that would result from the drawing of a complete and accurate sectional view. Generally, FIG. 1 is to be considered a view of one-half of the apparatus, as would be seen by taking a central, longitudinal section vertically of the apparatus, but many components are simplified as compared to what a true section would show.

One primary purpose of the FIG. 1 drawing is to show the geometrical relationship between the different essential components of the apparatus, this relationship being shown in a central, longitudinal, vertical plane.

Several of the components shown in FIG. 1 are pivotally related to one another, and where not otherwise specified, the pivot axes for these different components are to be taken as perpendicular to the plane of the drawing paper.

The primary pivot axis is shown at 22, and this point defines an axis fixed with respect to the plane 12, about which a digger arm 23, a sensing arm 24 and a packing arm 26 are all pivotally mounted. The specific inter-relationship of these arms in the direction normal to the paper is such that there will be no mechanical interference as the different arms pivot past one another. Although FIG. 1 does not make clear this geometrical inter-relationship, it will be understood that a person skilled in the art could readily devise structure to accomplish this arrangement using standard, conventional components.

A hydraulic cylinder 28 has its one end 29 pivotally secured to the superstructure 20, and has its other end 30 pivotally secured to the digger arm 23 by way of an upstanding projection 32. Extension and retraction of the hydraulic cylinder 28 causes the digger arm 23 to pivot about the axis 22.

A further hydraulic cylinder 34 has its upper end attached to a frame member 36 fixed with respect to the superstructure 20, and has its lower end pivoted at 38 to an arm 40 which in turn is pivoted at 41 to the packing arm 26 at an intermediate location thereof. Extension and retraction of the hydraulic cylinder 34 causes the packing arm 26 to pivot about the pivot axis 22.

The packing arm 26 is one of two such arms, each pivotally mounted about the axis 22, and each carrying a downwardly and inwardly canted packing wheel 42 mounted for free rotation on a downwardly extending bracket 44.

Preferably, the two packing arms 26 (only one seen in FIG. 1) are both connected to the link arm 40 and to the hydraulic cylinder 34. Also, the two packing wheels 42 are preferably arranged in such a way that they may contact the ground 45 immediately adjacent, and on either side of, a planting furrow cut by the apparatus 10, so that the spread-apart earth on either side of the furrow is forced back inwardly and is tamped around and against the planted seedling.

Figure 7:
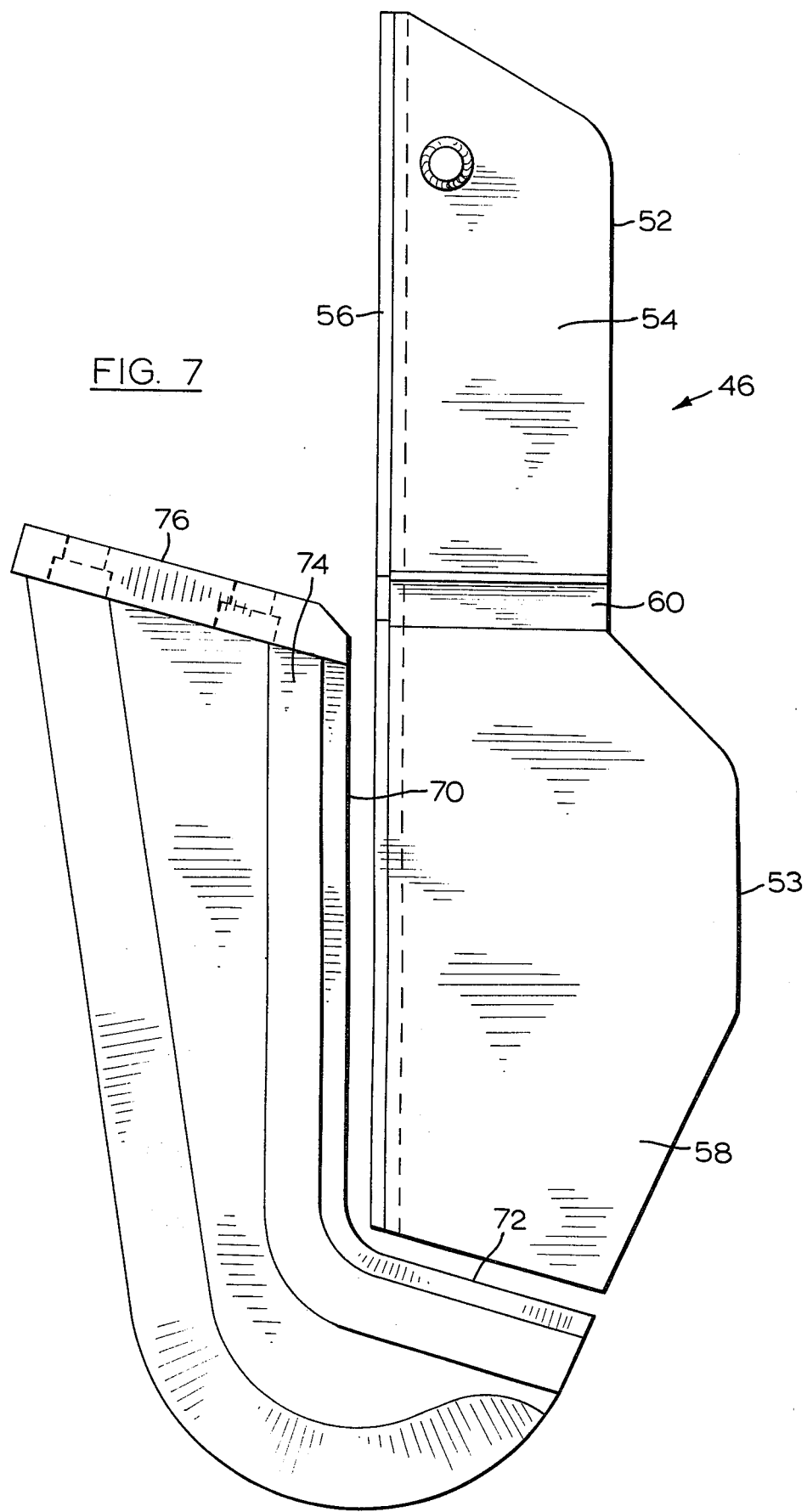
FIG. 7 is an elevational view of the digger and planter portion shown in FIG. 5.

The digger arm 23 carries at its end remote from the pivot axis 22 a digger assembly 46 which includes a dibble 48 and a planting shoe 50. In FIG. 1, the dibble 48 and the planting shoe 50 are buried to the maximum cutting depth in the ground. Attention is now directed to FIGS. 5, 6 and 7, which illustrate the digger assembly 46 in greater detail and to a larger scale.

In FIGS. 5 and 7, the planting shoe 50 is seen to include an upper portion 52 and a lower portion 53. The upper portion 52 is of greater width than the lower portion 53 and includes two parallel side walls 54 and a forward wall 56. These walls are preferably of heavy gauge steel plate, and are appropriately welded together.

The lower portion 53 of the planting shoe 50 includes two parallel side walls 58 each joined to its corresponding upper side wall 54 by virtue of a downwardly and inwardly sloping connecting wall 60 (only one visible in FIG. 5). The forward wall 56 is also welded to the two side walls 58 and is shaped to follow the general configuration of the planting shoe as it narrows from the upper portion 52 to the lower portion 53. The forward wall 56 can be seen in FIG. 5 in the lower portion 53 as well. The side walls 58 are open at the bottom as can be seen in FIG. 5.

The dibble 48 can be seen in FIGS. 5 and 7 to include a cutting member 62 which tapers at 64 to a cutting edge 66 which has a rectilinear portion at the top and a curved portion 68 at the bottom.

The rectilinear portion 67 of the cutting edge 66 constitutes the leading or forward edge of the dibble 48. The rearward limit of the dibble 48 closely follows but is spaced from the edge of the adjacent lower portion 53. Thus, as best seen in FIG. 7, the rearward limit of the dibble 48 includes a substantially vertical edge 70 and a downwardly and rearwardly sloping edge 72. The cutting member 62, in the particular embodiment shown, has a peaked or wedge-shape profile along the edges 70 and 72, and this is best seen at the bottom in FIG. 5. Welded to the cutting member 62 adjacent the edges 70 and 72 are two side plates 74 (only one visible in FIG. 7, but both visible in FIG. 5). The two side plates 74 are spaced by substantially the same distance as the side walls 58 of the planting shoe 50.

The upper end of the dibble 48 is welded to a bracket 76 which can be secured to the end of the digger arm 23.

Extending rearwardly through a rectangular opening 78 in the forward wall 56 adjacent the upper portion 52 of the planting shoe 50 are two spaced-apart fingers 80 which are capable of resilient movement toward and away from each other by virtue of their resilience. Preferably, the fingers 80 are made of light-gauge spring steel. Glued or otherwise adhered to the inside face of each finger 80 is a hollow elastomeric tube 82, the tubes 82 being of such a size that they are substantially in contact when the fingers 80 are in their at-rest position. If desired, the fingers 80 can have a slight outward divergence at their rearward end, as shown in FIG. 5, although this is not essential. If the divergence is provided, then the tubes 82 will not be in contact at the rearward end of the fingers 80.

An ejector plate 84 is provided to fit with a close tolerance within the upper portion 52 and a part of the lower portion 53 of the planting shoe 50. FIG. 6 shows the shape of the ejector plate 84, and further shows the presence of a rectangular window 85. As can be seen in FIG. 6, the upper portion of the ejector plate 84 is substantially rectangular, but the lower portion is cut to conform to the inner surface of the planting shoe 50 at the transition between the upper portion 52 and the lower portion 53 thereof.

As shown in FIG. 5, the ejector plate 84 is positioned with the two fingers 80 passing through the window 85, and the ejector plate 84 is intended to reciprocate longitudinally of the fingers 80. It is intended that the ejector plate 84 be moved back and forth along the fingers 80 by virtue of a push arm (not shown in FIG. 5 but seen in FIG. 4 to consist of two spaced components 86 and 87), which passes through a further opening 88 in the forward wall 56.

In operation, the digger arm 23 raises the digger assembly 46 to a position where it is accessible to the operator (who is riding on a appropriate seating arrangement positioned on the frame 12 just rearwardly of the wheels 18), so that he can position a seedling 90 between the fingers 80 such that it is gripped and held between the elastomeric tubes 82. The hydraulic cylinder 28 then extends, rotating the digger arm 23 clockwise about the pivot point 22 and forcing the digger assembly 46 into the ground to the position shown in FIG. 1. By a mechanism shortly to be described, the entry of the digger assembly 46 into the ground to the extent shown in FIG. 1 triggers a hydraulic cylinder shown at 92 in FIG. 4, which moves the components 86 and 87 of the push arm to the right and causes the ejector plate 84 to move rearwardly with respect to the fingers 80, thus ejecting the seedling 90 from between the fingers 80 and into the furrow being simultaneously cut by the digger assembly 46.

Figure 4:
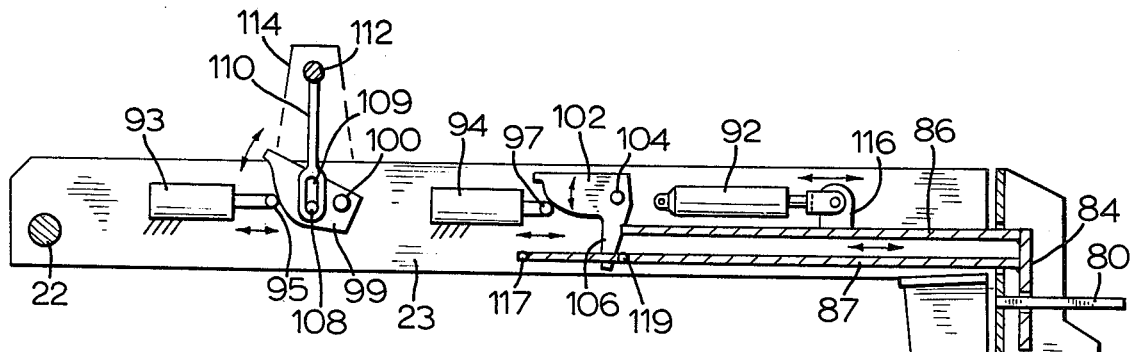
FIG. 4 is a slightly enlarged, essentially schematic view of the digger arm of the apparatus of this invention.

The triggering operation for the hydraulic cylinder 92 will now be described. Reference is made to FIG. 4, in which the digger arm 23 is shown schematically to include a number of components. FIG. 4 is not intended to be either an elevational or a sectional drawing of the digger arm 23, but is rather intended to show the geometric inter-relationship of the main components in the digger arm 23. In FIG. 4, a first valve body 93 and a second valve body 94 are mounted in fixed relationship to the digger arm 23, as shown by the open hatch lines (the conventional symbol). A valve shaft with a follower wheel 95 extends rightwardly from the first valve body 93, while a valve shaft with a follower wheel 97 extends rightwardly from the second valve body 94.

A first cam plate 99 is pivoted about an axis 100 which is fixed with respect to the digger arm 23, and a second cam plate 102 is pivoted about an axis 104 also fixed with respect to the digger arm 23. The second cam plate 102 has an extension 106. When the first cam plate 99 pivots in the counter-clockwise direction as seen in FIG. 4, it pushes the follower wheel 95 to the left, and when the second cam plate 102 pivots in the counter-clockwise direction as seen in FIG. 4, it moves the follower wheel 97 to the left. Both valve shafts and follower wheels are spring-biased to the right, so that when either cam plate moves in the clockwise direction, the respective valve shaft moves to its furthest rightward position.

Figure 2:
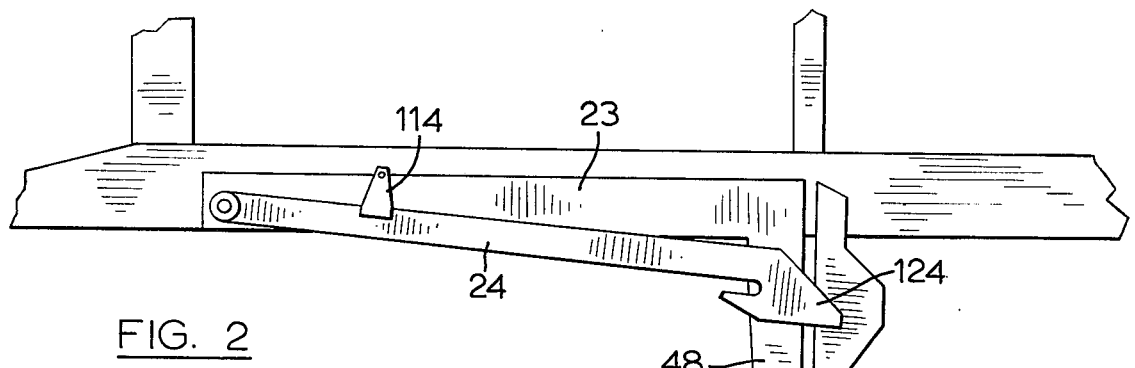
FIGS. 2 and 3 are partial elevational views of the digger arm of this invention, showing the arm in two phases of its operation immediately previous to the phase shown in FIG. 1.
Figure 3:
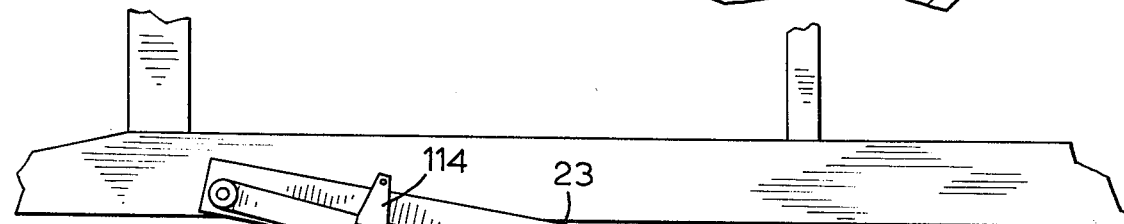

The first cam plate 99 has fixed to it a pin 108 which is trapped within an elongated slot 109 at the lower end of a pull-arm 110. The other end of the pull-arm 110 is connected to a cross-shaft 112 which is fixed with respect to a bracket 114 secured not to the digger arm 23 but rather to the sensing arm 24 as seen in FIGS. 1, 2 and 3. Because the digger arm 23 and the sensing arm 24 can pivot independently of one another, the bracket 114 is capable of arcuate movement with respect to the digger arm 23 about the pivot axis 22.

In FIG. 4, the bracket 114 is shown at its uppermost position, and it will be seen that the pin 108 is at the lowest part of the slot 109. This means that whenever the bracket 114 is in its uppermost position with respect to the digger arm 23, the cam plate 99 is forced to move in the clockwise direction thus permitting the follower wheel 95 to move to the right with respect to the first valve body 93. Conversely, when the bracket 114 moves downwardly to the digger arm 23, the pin 108 is eventually contacted by the upper end of the slot 109, and as a result the cam plate 99 is rotated in the counter-clockwise direction, thus driving the follower wheel 95 leftwardly with respect to the valve body 93. This represents the two operating positions for the valve body 93. Whenever the follower wheel 95 is at its rightward limit with respect to the valve body 93 (the position shown in FIG. 4), the cylinder 92 is activated to extend itself. The cylinder 92 has its leftward end fixed with respect to the digger arm 23, and has its rightward end attached to a bracket 116 which is in turn fixed to the component 86 of the push arm which operates the ejector plate 84. The push arm and the ejector plate 84 have been hatched in FIG. 4, not because they are shown in section but rather to distinguish them visually from the other components shown in FIG. 4.

The lower component 87 of the push arm in FIG. 4 has, at its leftward end, a catch pin 117 which is intended to strike the extension 106 of the second cam plate 102 just as the push arm is reaching its furthest rightward position at the end of the extension stroke of the cylinder 92. As the catch pin 117 strikes the extension 106, it causes the second cam plate 102 to rotate in the counter-clockwise direction from the position shown in FIG. 4, thus driving the follower wheel 97 leftwardly toward the second valve body 94. Leftward movement of the follower wheel 97 changes the valve body 94 to its other operative position, which causes retraction of the hydraulic cylinder 92. A further catch pin 119 can also be provided on the lowermost component 87 of the push arm, such that the catch pin 119 can strike the extension 106 from the right-hand side upon the return movement of the push arm, thereby to rotate the second cam plate 102 in the clockwise direction, and to permit the resilient biassing means incorporated into the second valve body 94 to return the follower wheel 97 to its furthest rightward position, which in effect is its "off" position.

A simple hydraulic circuit may be provided (not shown) by which the actuation of the second valve body 94 (follower wheel 97 to the left) renders inactive the operation of the first valve body 93. It is also a simple matter to provide hydraulic circuitry which permits the second valve body 94, when activated by leftward movement of the follower wheel 97, to cause the hydraulic cylinders 34 to pivot the packing arms 26 downwardly and carry the packing wheels 42 down against the ground to pack the earth in around a planted seedling.

Attention is now directed to FIGS. 2 and 3, which precede in order the planting phase shown in FIG. 1, and which also illustrate the response of the apparatus of this invention to subterranean obstacles such as boulders and rocks.

FIG. 2 shows the dibble 48 riding over a buried rock 120 which is located just below the surface. The dibble 48 has penetrated only a short distance into the ground and has come into contact with the rock 120.

The sensing arm 24 is freely pivoted with respect to the digger arm 23, but detent means are provided to limit the extent of the arc through which the sensing arm 24 may move with respect to the digger arm 23. In FIG. 2 the sensing arm 24 is shown at its lowermost position with respect to the digger arm 23. The detent means which establish this lowermost position may be incorporated into the structure of the bracket 114, or alternatively any number of mechanical stop or detent means may be provided. While suitable detent means to limit the movement of the sensing arm 24 in the other direction with respect to the digger arm 23 may be provided, this is not essential because gravity will tend to make the sensing arm 24 seek its furthest clockwise position with respect to the digger arm 23.

FIG. 2 can be looked at in two ways. If the rock 120 were not present, then FIG. 2 could be considered to illustrate the initial bite of the dibble 48 into the ground at the beginning of a planting stroke. The digger arm 23 is descending under the urging of the hydraulic cylinder 28, after having been raised to an upper position in which the operator has inserted a seedling between the fingers 80. Now, where a rock such as the rock 120 is present, it is obvious that the planting stroke will be arrested at the position shown in FIG. 2, until the apparatus moves beyond the rock 120.

If it is now supposed that the rock is somewhat larger, and dips down further under the surface of the ground, such as does the boulder 122 in FIG. 3, it will be understood that the dibble 48 will be able to penetrate into the earth as far as is permitted by the boulder 122. In the position shown in FIG. 3, the sensing arm 24 is still in its furthest clockwise position with respect to the digger arm 23. The sensing arm 24 has, at its free end, a sensing shoe 124 which in FIG. 3 is just resting lightly against the surface of the ground. The sensing shoe 124 is displaced to the side of the dibble 48, and therefore does not enter the furrow being cut by the dibble 48.

By ignoring the presence of the boulder 122, FIG. 3 can also be considered to be an intermediate phase in the planting stroke of the digger arm 23, in which the dibble 48 has entered part-way into the earth.

The final phase of the planting stroke is shown in FIG. 1, in which the digger arm 23 has continued to move in the clockwise direction, while the sensing arm 24 has remained in the same orientation as is shown in FIG. 3. This causes the sensing arm 24 and the digger arm 23 to rotate with respect to each other, and the net result of this mutual rotation is that the bracket 114 moves upwardly with respect to the digger arm 23, and as explained with respect to FIG. 4, this causes the initiation of the ejection stroke of the cylinder 92.

It will thus be appreciated that, where the apparatus 10 moves across terrain which is such as to prevent the dibble 48 from fully entering the earth, the sensing arm 24 and the digger arm 23 will not reach the mutual position shown in FIG. 1, and the seedling ejection will not take place.

It will be appreciated that conventional hydraulic circuitry may be provided such that, on terrain without any obstacles, the digger arm 23 could be raised and lowered in a regularly repeating cycle, and that under normal operation the packing arms 26 would move up and down in coordination with the digger arm 23 to pack earth around the sequentially planted seedlings. Whenever the dibble 48 meets some obstacle which prevents the full penetration of the dibble 48 into the earth, the seedling-ejection will not take place, nor will the packing arm 26 be actuated to bring the packing wheels 42 down into contact with the earth.

It will also be understood that it is possible to regulate the force with which the two hydraulic cylinders 34 and 28 function, and thereby to regulate the force with which the dibble 48 is driven into the ground and the force with which the packing wheels 42 bear against the earth.

It will also be understood that it is possible to provide for manual operation of the different hydraulic cylinders as an over-ride precaution against failure of the automatic equipment.

It will also be understood that, while the several arms 23, 24 and 26 are shown to be pivoted about the same axis 22, this construction is certainly not essential to the invention.

The apparatus 10 shown in FIG. 1 of the accompanying drawings also illustrates a chain-drag clearing means 126 which includes a plurality of link members 128 (only two shown in complete outline), and a rotating arm member 130 which is capable of rotating about the point 132 in the clockwise direction, and thereby lifting the chain clear of the ground. The purpose of the clearing means 126 is to scrape light debris, slash and surface obstructions away from the path of the dibble 48.

What I claim as my invention is:

1. Planting apparatus, comprising:
    a mobile frame adapted to travel forwardly over the ground,
    an arm swingably mounted to the frame and extending generally rearwardly from the mounting location,
    dibble means carried by the arm remote from said mounting location and adapted to cut into the ground when the arm swings toward the ground during forward travel of the frame,
    planter means carried by the arm rearwardly of said dibble means and adapted to support a seedling for planting in the cut made by said dibble means,
    dislodging means adapted selectively to dislodge a seedling from said planter means into said cut,
    detection means for detecting when the dibble means has cut to a pre-determined depth into the ground and for activating said dislodging means whenever such pre-determined depth is reached,
    and means for regularly swinging the arm toward and away from the ground,
    whereby said dislodging means fails to operate if the dibble means fails to achieve said pre-determined depth due to an obstacle.

2. The invention claimed in claim 1, in which said detection means includes a further swingably mounted arm extending rearwardly from its mounting location in general alignment with said first-mentioned arm, but capable of limited downward swinging movement away from the first-mentioned arm under gravitational influence; said further arm contacting the ground as the first-mentioned arm swings downward, whereby the latter moves closer into alignment with said further arm as the dibble means enters the ground; and switch means between the two arms adapted to activate said dislodging means when the arms come together upon penetration of said dibble means to said pre-determined depth.

3. The invention claimed in claim 2, in which both arms are pivoted to said mobile frame about the same axis.

4. The invention claimed in claim 1, further comprising tamping means mounted to said mobile frame rearwardly of said planter means, for tamping the earth around a planted seedling.

5. The invention claimed in claim 4, in which said tamping means includes tamping arm means pivoted to said mobile frame and extending rearwardly from the pivot, the tamping arm means supporting two downwardly and inwardly canted tamping wheels adapted to press downwardly in rolling engagement with the earth on either side of said cut, and means for urging said tamping arm means and tamping wheels downwardly to achieve said engagement.

6. The invention claimed in claim 1, in which said planter means includes two rearwardly extending horizontally adjacent fingers with friction means to enable them resiliently to grip and hold a seedling placed between them, and in which said detection means includes pusher means mounted for reciprocation lengthwise of the fingers and capable of dislodging a seedling from between the fingers.

7. A method of sequentially planting seedlings in the earth, comprising the steps:
    alternatingly lowering a dibble into the earth and retracting it from the earth as the dibble moves forwardly in a line with respect to the earth, thereby to cut an intermittent furrow into the earth,
    feeding seedlings sequentially to a location rearwardly of the dibble prior to each sequential entry of the latter into the earth, and holding the seedlings at said location until the dibble enters the earth,
    detecting the presence in the earth of any obstacle which prevents the entry of the dibble into the earth to a pre-determined depth, and releasing the respective seedling into the furrow only when no such obstacle is detected.

8. The method claimed in claim 7, which further includes the final step of tamping the cut furrow in around each dislodged seedling.

9. The method claimed in claim 7, in which the step of detecting is carried out by a movable member adapted to move down toward the ground along with the dibble and to contact the ground before the dibble cuts to said pre-determined depth, whereby the ground arrests the downward movement of said movable member while the dibble is penetrating into the earth and moving closer to the arrested member, and by registering whether the dibble and the movable member reach that propinquity corresponding to entry of the dibble to said pre-determined depth into the earth, whereby unless said propinquity is attained release of a seedling fails to occur.

10. Planting apparatus, comprising:
- a mobile frame adapted to travel forwardly over the ground,
- a first arm swingably mounted to the frame and extending generally rearwardly from the mounting location,
- dibble means carried by the first arm remote from said mounting location and adapted to cut into the ground when the first arm swings toward the ground during forward travel of the frame,
- planter means carried by the first arm rearwardly of said dibble means and adapted to support a seedling for planting in the cut made by said dibble means,
- dislodging means adapted selectively to dislodge a seedling from said planter means into said cut,
- means for regularly swinging the first arm toward and away from the ground,
- detection means for detecting when the dibble means has cut to a pre-determined depth into the ground and for activating said dislodging means whenever such pre-determined depth is reached, said detection means including a second swingably mounted arm extending rearwardly from its mounting location in general alignment with said first arm, said second arm being adapted to contact the ground as the first arm swings downward, whereby the first and second arms approach and achieve a particular mutual orientation whenever the dibble means has penetrated the ground to a pre-determined depth, and switch means between the two arms adapted to activate said dislodging means whenever the arms achieve said particular mutual orientation;
- whereby said dislodging means fails to operate if the dibble means fails to achieve said pre-determined depth due to an obstacle.

* * * * *